(12) United States Patent
Schurig

(10) Patent No.: US 6,183,405 B1
(45) Date of Patent: Feb. 6, 2001

(54) ROLLER WHEEL DEVICE FOR SUPPORTING HEAVY OBJECT

(75) Inventor: Karl Schurig, Remescheid (DE)

(73) Assignee: Signode Bernpak GmbH, Dinslaken (DE)

( * ) Notice: Under 35 U.S.C. 154(b), the term of this patent shall be extended for 0 days.

(21) Appl. No.: 09/413,635

(22) Filed: Oct. 6, 1999

(30) Foreign Application Priority Data

Oct. 7, 1998 (DE) ................................................ 198 46 161

(51) Int. Cl.$^7$ ............................... B25F 5/02; B60B 33/00
(52) U.S. Cl. ............................................. 492/45; 16/18 B
(58) Field of Search ............... 16/18 B; 254/84; 492/45

(56) References Cited

U.S. PATENT DOCUMENTS 4,467,496 * 8/1984 Gregg ..................................... 16/18 B
5,628,377 * 5/1997 Le Gloan ............................ 16/18 B

* cited by examiner

*Primary Examiner*—Irene Cuda
(74) *Attorney, Agent, or Firm*—Lowe Hauptman Gilman & Berner, LLP

(57) ABSTRACT

A roller device has a bearing axle and a wheel rotatably mounted to the axle in a roller housing. A lifting device is connected to the axle and wheel and is movable to raise and lower the wheel out of and into a travelling plane. A supporting device is fitted to the lifting device and has a support area lowered onto the travelling plane in response to rotation of the lifting device. The lifting device comprises a pair of eccentric discs which are mounted at both ends of the bearing axle and are connected thereto in a rotationally fixed manner. One of the discs engages in a form locking manner a corresponding recess in a side plate of the supporting device and at least one of the discs has two spaced apart spiked surfaces which can be rotated with the disc about the bearing axle in opposite directions against a stop protrusion on the side plate to thereby raise and lower the wheel. In this manner, in the raise position of the wheel, the supporting device provides stationary support for the roller disc and a load supported thereon by contacting a support surface. In the lower position of the wheel onto the travelling plane, the roller device and load supported thereon are rotatable relative to a supporting surface.

11 Claims, 6 Drawing Sheets

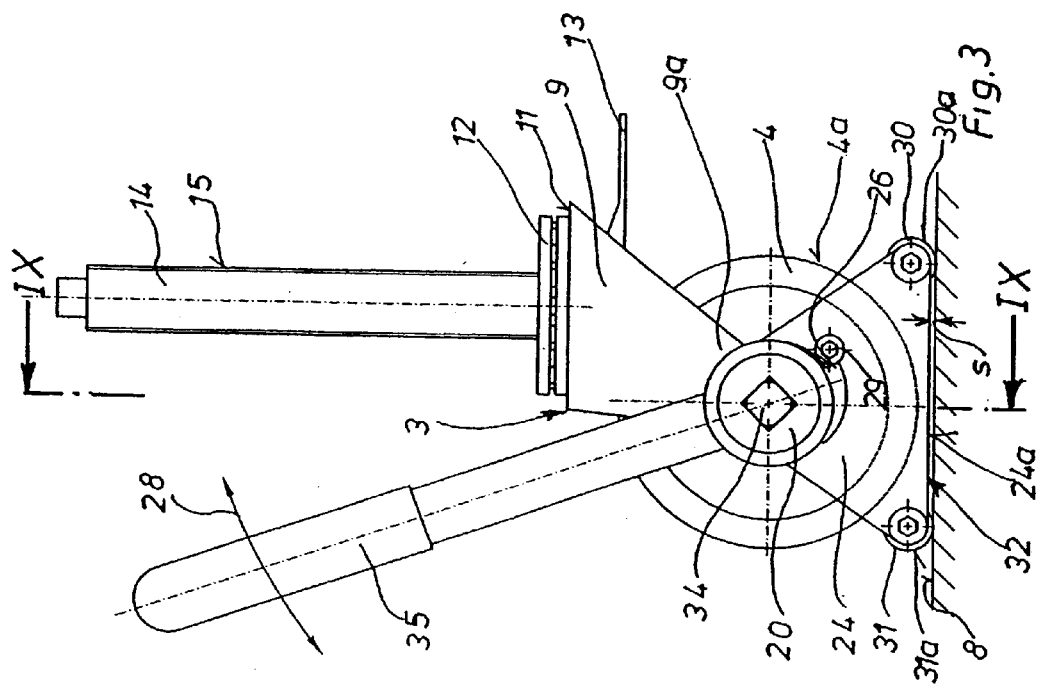

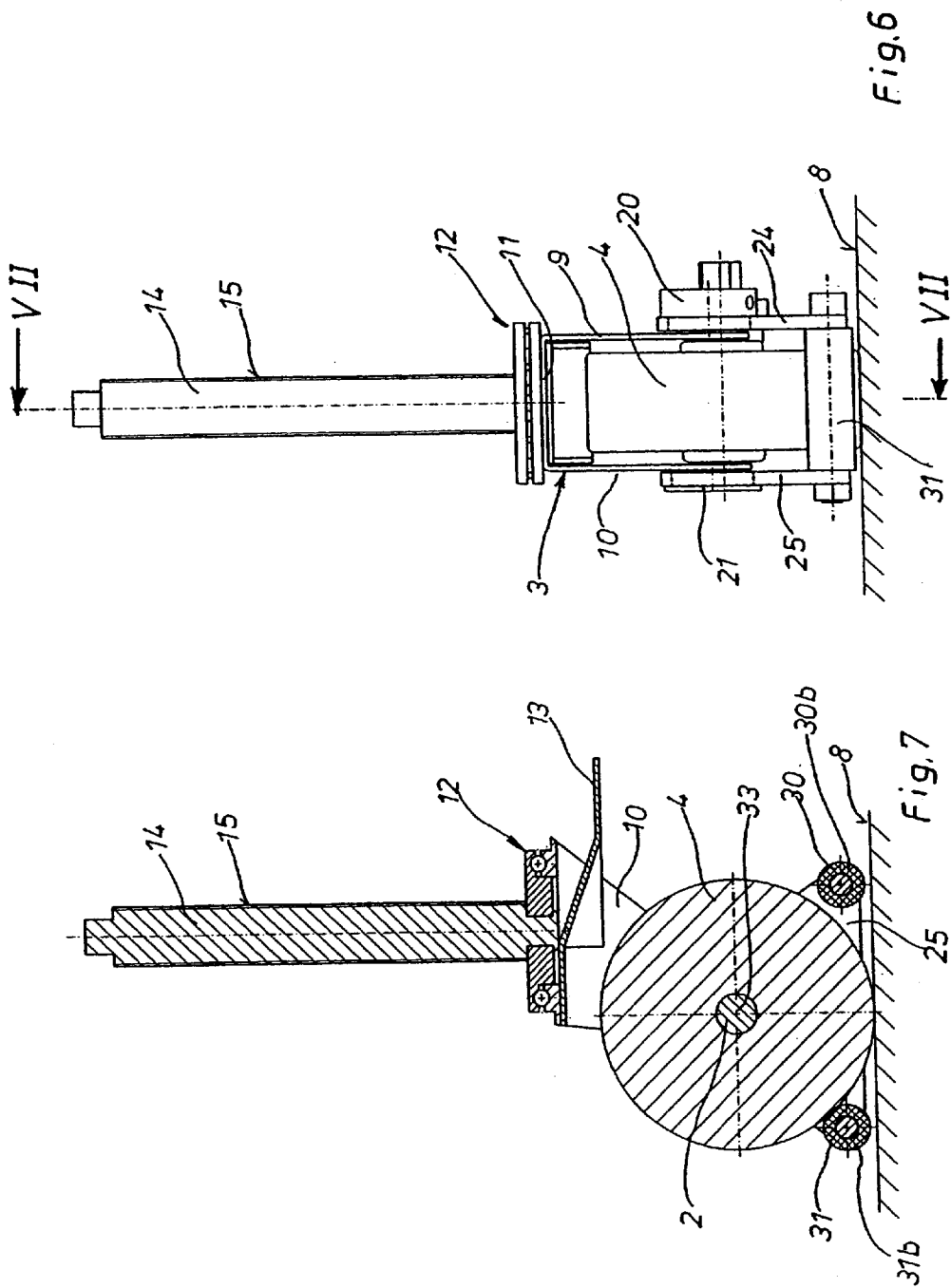

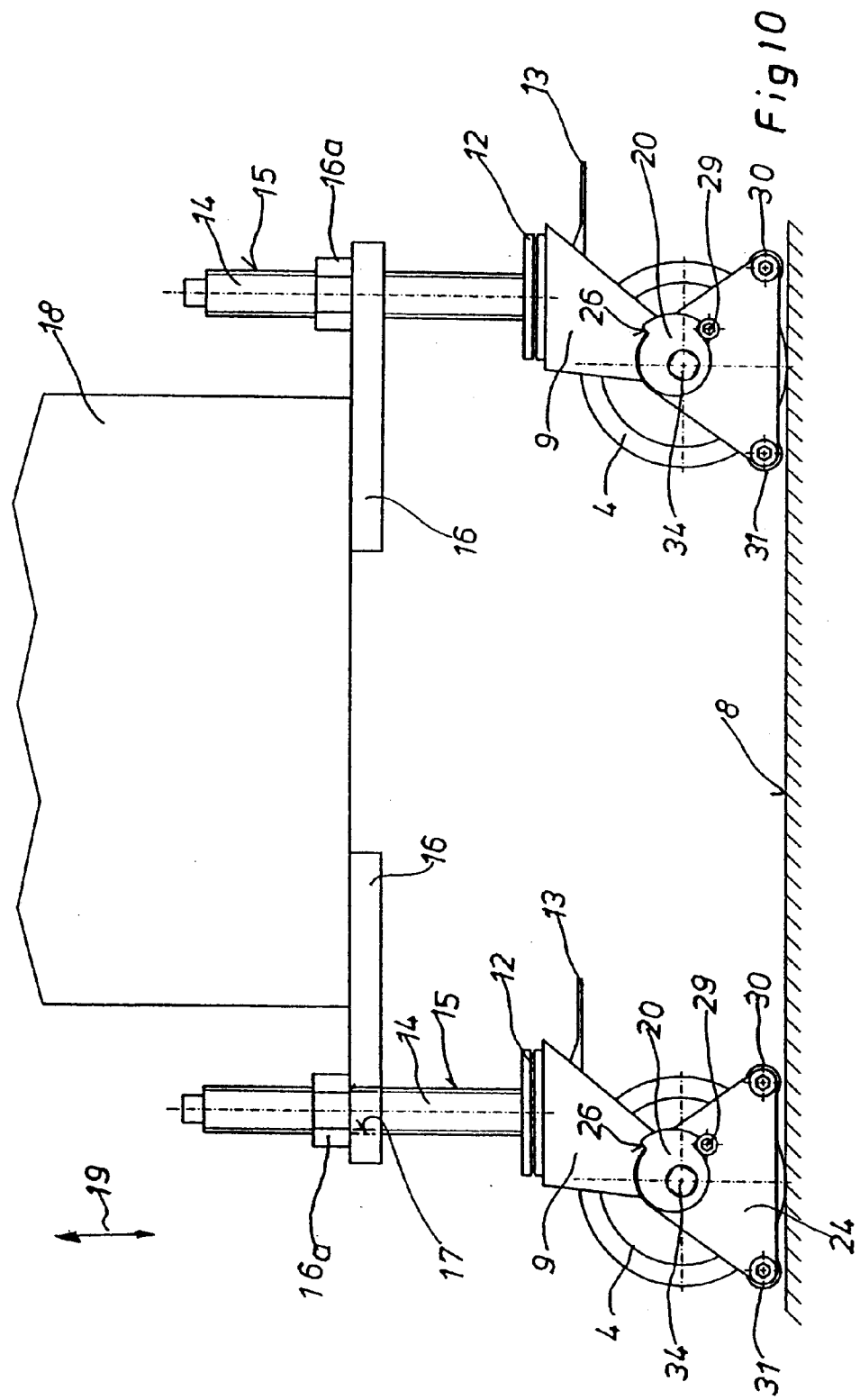

ROLLER WHEEL DEVICE FOR SUPPORTING HEAVY OBJECT

TECHNICAL FIELD

The invention concerns a roller with a bearing axle on which a wheel is rotatably mounted in a roller housing, which wheel for the purpose of its fixing is raised off its travelling plane together with its bearing axle and the housing by means of a lifting device into a position past the dead centre and at the same time a supporting device fitted to the housing with its support area is lowered by means of the same lifting device onto the travelling plane.

BACKGROUND ART

A known roller of this kind according to the German utility model 87 00 869.6 U1 has wheels at both ends of a bearing axle between which wheels a two-armed lever as well as a single-armed lever, interacting with each other, are provided in such a manner that when a pedal surface of the two-armed lever is pressed downward clockwise, the single-armed lever with a base is pressed against the travelling plane and at the same time the roller, together with its bearing axle and the housing is raised into an unstable position past dead centre. A slight push against the pedal surface of the two-armed lever, a free actuating end of which protrudes past a external circumferential contour of the wheels, pivots the lever upward (counter-clockwise) to displace it from the unstable position past the dead centre. In addition to its complicated construction which is susceptible to breakdown and apart from its poor appearance, this roller has a relatively small support area under high pressure. For this reason it can be used only for light loads, e.g. in the form of mobile clothes stands for store equipment as stated in this prior publication. These rollers are definitely not suitable to accept greater loads, e.g. from 100 kg to 350 kg per roller, as is the practice in packaging machines.

An object of the invention is to produce a roller which while having a considerably greater load carrying capacity reliably precludes an accidental release of the roller after its fixing and, while having a simple construction, assures a stable supporting device with great load carrying capacity together with a lifting device which is simple to operate.

SUMMARY OF THE INVENTION

According to the invention, a lifting device comprises two eccentric discs which are mounted at both ends of the bearing axle and are connected in a rotationally fixed manner. One of the discs engages in a form-locking manner a corresponding circular or oval recess in one side plate of the supporting device and at least one of the eccentric discs has two defined strike surfaces for two stable positions past the dead centre. These strike surfaces can be rotated about the bearing axle in opposite directions against a stop protrusion on one of the side plates. This arrangement enables the swivelling of the eccentric disc in two opposite directions to reach two stable positions past the dead centre by simply rotating the bearing axle, one of these positions defining the raised position of the roller and the other the lowered position of the roller. Since the side plates, depending on the pressures to be expected, may have support areas with large and very varied shapes, this roller is suitable not only to accommodate heavy loads but can also function as a fixed castor and, when provided according to the state-of-the-art with a rotating ring, also as a swivelling castor.

According to an advantageous refinement of the invention, the supporting device comprises two side plates provided on the bearing axle at both sides of the housing. The side plates, having relatively long support areas, are facing the travelling plane and in the vicinity of the travelling plane are joined by two connecting bolts which protrude past the ends of the external circumferential contour of the wheel to form a stable and relatively large-area support skid. By virtue of this construction a stable structure to accommodate heavy loads is produced, which can be quickly raised and lowered. In addition, this support skid has a protective function inasmuch as the operator's feet no longer will be hit or rolled over by the wheel(s) of a roller. There are no protruding parts by means of which accidentally acting forces could swivel the eccentric disc from its position past the dead centre.

To establish an even more stable support surface in the supporting position the connecting bolts form with their external circumference a portion of the support area of the supporting device. In an advantageous manner the connecting bolts are provided with a friction-promoting, elastic cover which is compressed in the lower position of the support skid. As a result of this, the friction between the support skid and the travelling plane is considerably increased.

According to an alternative embodiment the connecting bolts are provided at a distance above the travelling plane and form a carrier and pivoting axle for a further, smaller support skid suspended thereon, which can be manufactured from a hard rubber or a wear-resistant plastic material. Consequently, the undulation of the floor can be compensated for in a simple manner especially on inclined levels.

According to an advantageous refinement of the invention, the side plates of the supporting device have a triangular or trapezoidal shape with rounded corners and are provided in a displaceable manner on the eccentric discs so that the side plates can be raised and lowered by these eccentric discs. So that the lowering and raising would not occur arbitrarily, at least one end of the bearing axle has an actuating spigot with a polygonal cross-section, which may be triangular, rectangular or hexagonal, to enable use of a spanner or a ratchet, with the the support skid by means of the eccentric disc.

The housing of the roller has a U-shaped cross-section, known per se, the free ends of its U-legs accommodating the bearing axle at both its end regions and the transverse web of which has a rotating ring known per se with a fixing lever. By virtue of this arrangement of the rotating ring with the fixing lever such a roller can be used in an advantageous manner as a swivelling castor. Without the rotating ring, this roller is used as a fixed castor.

According to an advantageous refinement of the invention, one of the eccentric discs protrudes past the relevant external surface of the side plate of the support skid and is provided with two strike surfaces on this protruding portion for the two stable positions past the dead centre.

Advantageously the stop protrusion interacting with the two strike surfaces is a stop pin which protrudes past the external surface of the side plate and protrudes with the protruding eccentric disc, which pin is pressed, riveted or screwed into a hole of this side plate of the support skid. To enable height adjustment of the load carried by the roller, a fastening bolt with an external thread is provided on the housing (with or without the rotating ring) perpendicularly to the travelling plane of the wheel to penetrate a bracket having a corresponding internal thread, onto which bracket the load to be carried by the roller can be placed in a height adjustable and lockable manner. Since the fastening bolt is provided rotatably on the housing, it can be rotated by means of its polygonal spigot provided on its free end using a spanner or a ratchet and, accordingly, the bracket situated on it can be moved upward or downward.

Depending upon the load and the purpose of application the parts of the lifting device and of the support skid are made totally or partly from steel or plastic material or a combination of these materials.

BEST MODE FOR CARRYING OUT THE INVENTION

Figure 1:
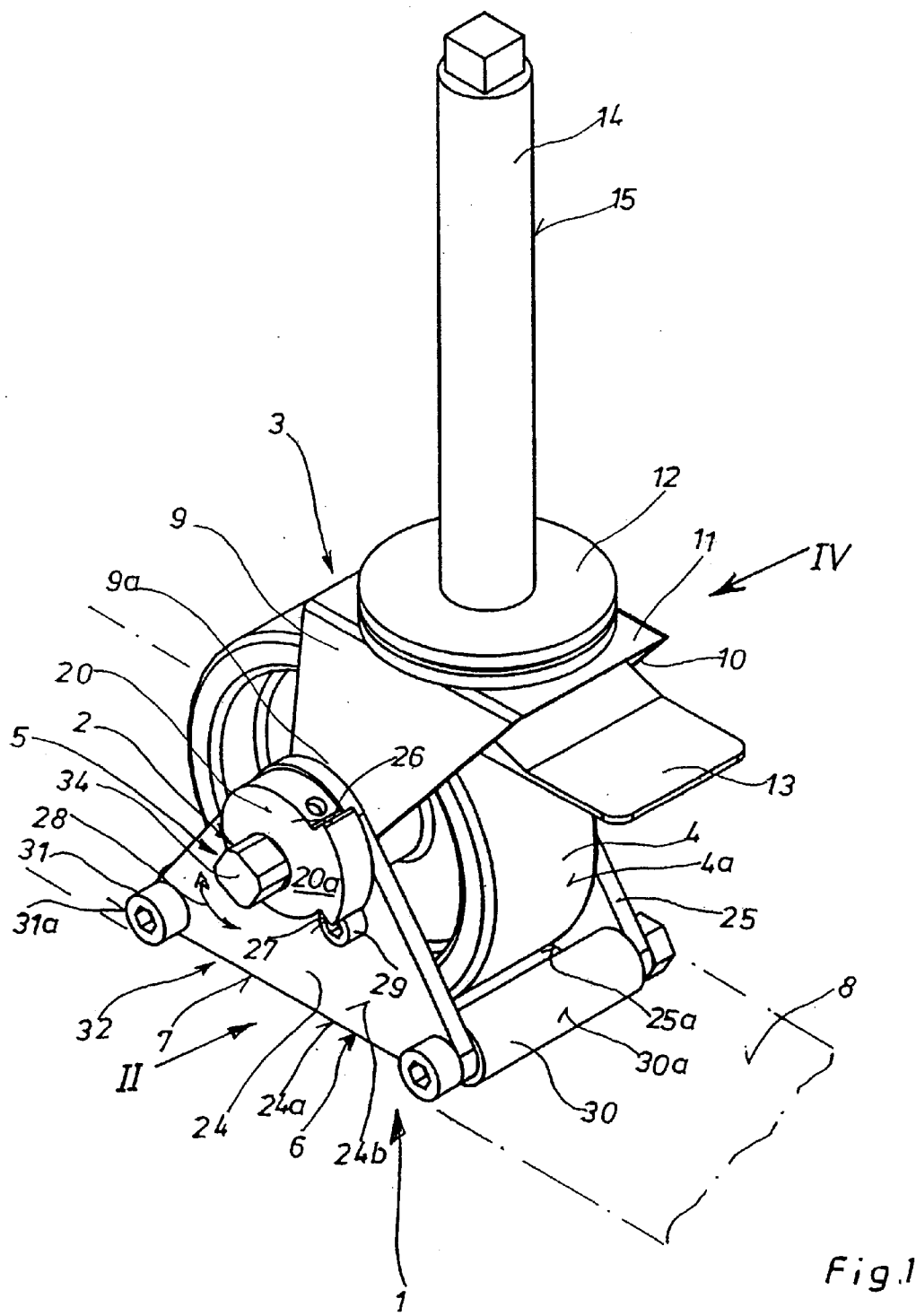
FIG. 1 - is a perspective top view of the roller according to the invention with a rotating ring and a fastening bolt having an external thread to penetrate a bracket with a corresponding internal thread, FIG. 2 - is a side view of the roller of FIG. 1 in the direction of arrow II with the wheel lowered onto the travelling plane and the supporting device raised, FIG. 3 - is similar to FIG. 2 with the wheel lifted off the travelling plane and the supporting device simultaneously lowered by means of a ratchet engaging the bearing axle, FIG. 4 - is a rear view of the roller in the direction of the arrow IV of FIG. 1, FIG. 5 - is a top view of the roller in the direction of arrow V of FIG. 4, FIG. 6 - is a view of the roller in the direction of arrow VI of FIG. 2, FIG. 7 - is a sectioned view of the roller taken along line VII—VII of FIG. 6, FIG. 8 - is a sectioned view of the roller taken along line VIII—VIII of FIG. 2 with the wheel lowered and the supporting device raised, FIG. 9 - is a sectioned view taken along line IX—IX of FIG. 3 with the wheel lifted off the travelling plane and the supporting device simultaneously lowered, without load, and FIG. 10 - is a side view of two rollers according to FIG. 2 with the rotating rings and the fastening bolts with external thread provided on them, each carrying a bracket with a load situated on them.
Figure 4:
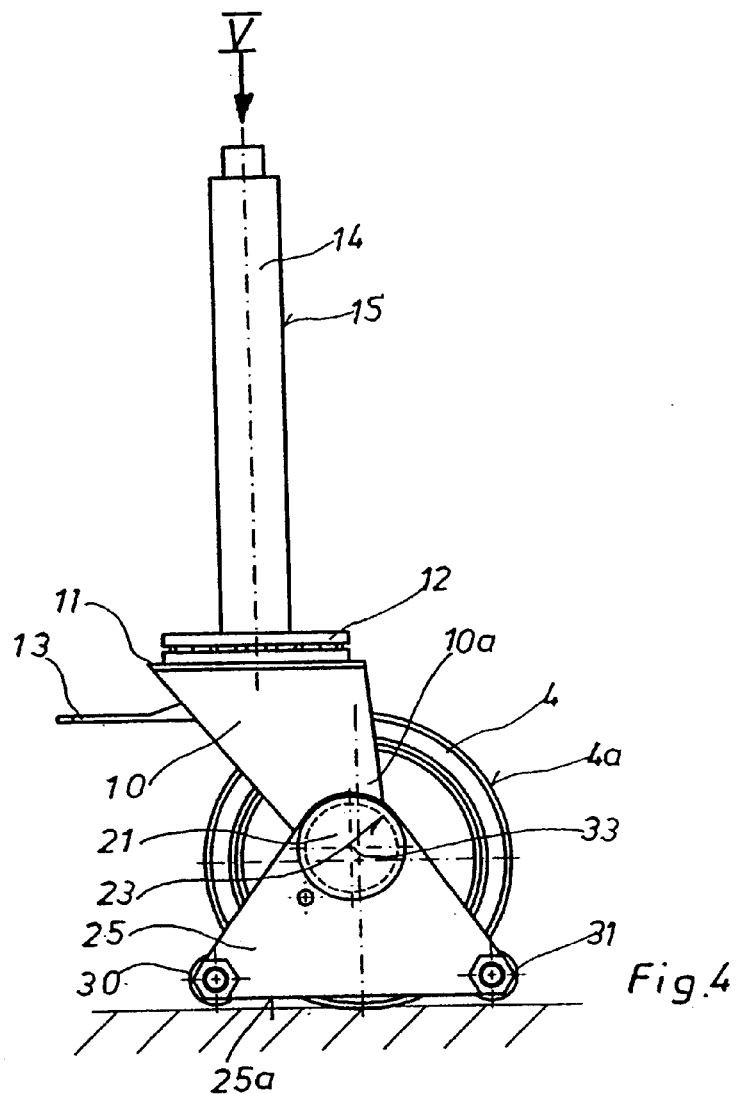
Figure 5:
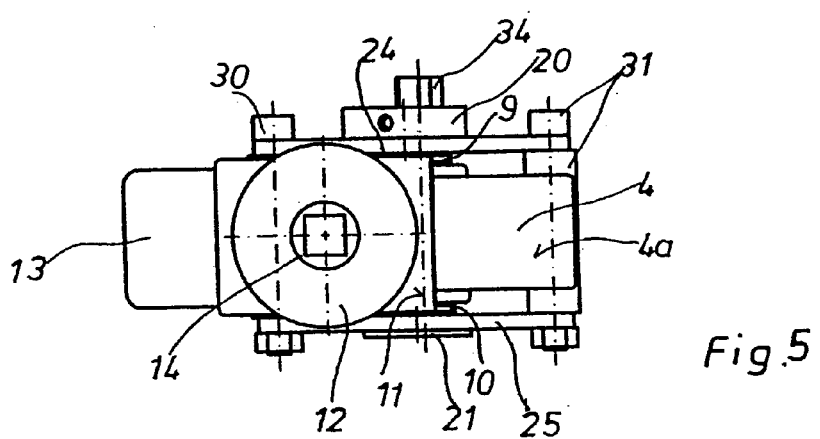

The roller 1 according to FIGS. 1 to 3 comprises essentially a bearing axle 2, on which a wheel 4 is rotatably mounted in a roller housing 3, which wheel, together with the bearing axle 2 and the housing 3, is raised by means of a lifting device 5 off its travelling plane 8 past the position of dead centre and at the same time a supporting device 6 attached to the housing 3 with its total support area 7 is lowered by means of the same lifting device 5 onto the travelling plane 8. The housing 3 has a known U-shaped cross-section with the free ends 9a, 10a of U-legs 9, 10 accommodating the bearing axle 2 at both of its end regions 2a, 2b (see FIGS. 8 and 9). The transverse web 11 of the housing 3 is provided with a known rotating ring 12 and a fixing lever 13, by means of which the rotational mobility of the rotating ring 12 can be locked. A fastening bolt 14, having an external thread 15, is provided on the transverse web 11 of the housing 3 perpendicularly to the travelling plane 8, which fastening bolt, as illustrated, can also be fastened on the rotating ring 12.

According to FIG. 10, this fastening bolt 14 with its external thread 15 engages a bracket 16 having a corresponding internal thread 17, by virtue of which a load 18, arranged on the brackets 16, can be adjusted precisely both upwards and downwards in the directions of the double arrow 19. The nuts 16a serve the purpose of locking.

According to the invention the lifting device 5 comprises two eccentric discs 20, 21, which are connected in a rotationally fixed manner with both ends 2a, 2b of the bearing axle 2, one of the eccentric discs engaging in a form-locking manner a corresponding circular or oval recess 22, 23 (see FIGS. 8 and 9) of a side plate 24, 25 each of the supporting device 6.

Moreover, according to FIGS. 1 to 3, the eccentric disc 20 has two defined strike surfaces 26, 27, which can be rotated about the bearing axle 2 in opposite rotating directions according to the double arrow 28 of FIG. 1 against the stop protrusion 29 on one of the side plates, in this case side plate 24.

In the case illustrated, the supporting device 6 comprises two side plates 24, 25 provided on the bearing axle 2 on both sides of the U-legs 9, 10 of the housing 3, which side plates, having a relatively long support area 24a, 25a, are facing the travelling plane 8 of the wheel 4. In the vicinity of their ends the support areas 24a, 25a project past the respective circumferential contour 4a the wheel 4 and are joined there by means of connecting bolts 30, 31 to form a stable support skid 32 with a relatively large-area.

In the mounted state with their external periphery 30a, 31a the connecting bolts 30, 31 form a part of the total support area 7 of the supporting device 6. These connecting bolts 30, 31 are provided with a friction-intensifying, entropy-elastic cover 30b, 31b, which is compressed under load in the lowered position (see FIGS. 3 and 7) of the support skid 32. As is shown in FIG. 3, in the supporting position of the connecting bolts 30, 31 the support areas 24a, 25a of the side plates 24, 25 are still at a small distance s above the travelling plane 8. In contrast to this, when exposed to the load 18 of FIG. 10, the support areas 24a, 25a of the side plates 24, 25 are also pressed against the travelling plane 8 after the entropy-elastic covers (30b, 31b) of the connecting bolts 30, 31 have been compressed.

Figure 9:
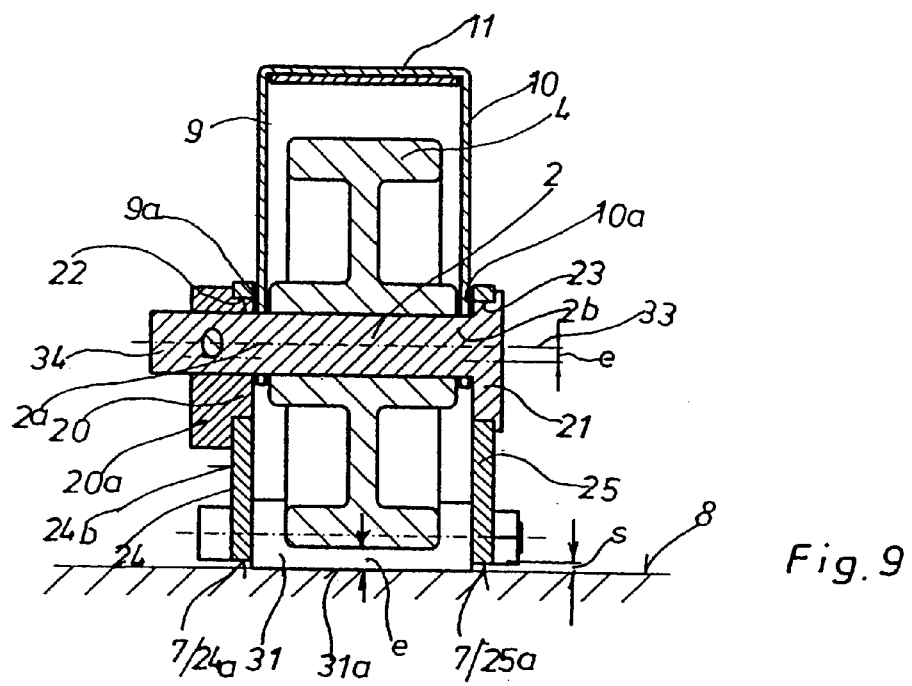

For this reason the figures showing the lowered supporting device 6 in FIGS. 3 and 9 show a non-loaded state of the roller 1, since in these figures the gap s between the support areas 24a, 25a of the side plates 24, 25 is still visible in every case.

In the cases illustrated the side plates 24, 25 of the supporting device 6 have a triangular shape with rounded corners which, however, can be replaced by a trapezoidal shape. The side plates 24, 25 are on the external surface of the housing 3, therefore in this case on the external surface of the U-legs 9, 10, with their circular or oval recesses 22, 23 provided in a displaceable manner on the eccentric discs 20,21 so that the side plates can be raised and lowered by these eccentric discs. The diameter or the oval half-axis of the recesses 22, 23, plus a clearance fit, correspond to the swivelling about the longitudinal axis of the eccentric disc 20, 21.

Figure 8:
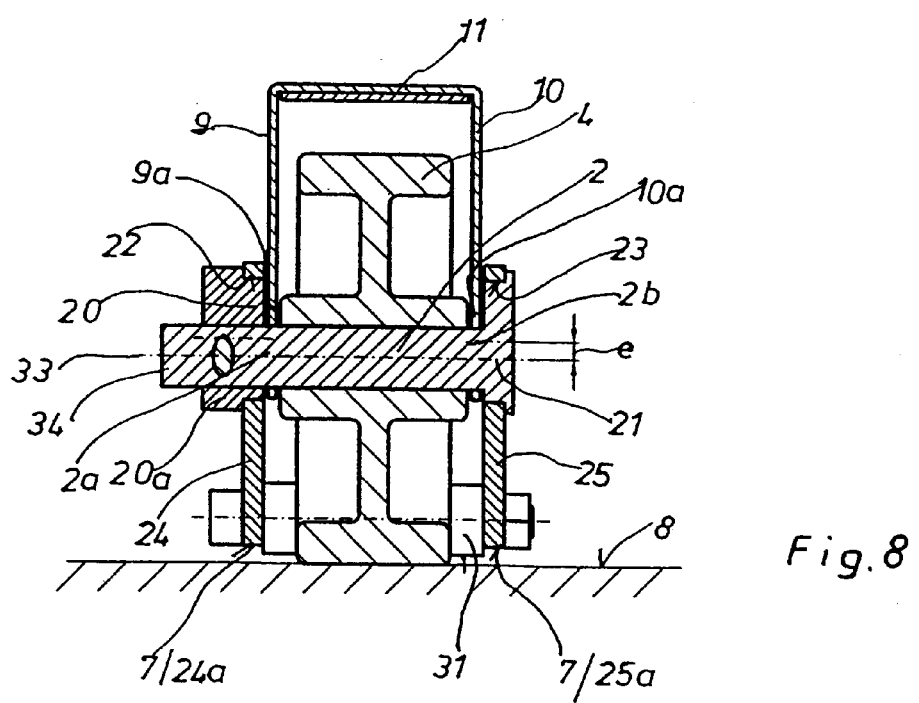

According to FIGS. 8 and 9 the wheel 4 can be lifted off the travelling plane 8 on the one hand, and on the other hand the supporting device 6 with the support areas 24a, 25a of its side plates 24, 25 situated above the travelling plane 8 only by a small gap a, can be lowered by the eccentricity e of the eccentric disc 20, 21 relative to the axis of symmetry 33 of the bearing axle 2. However, this gap s disappears under load, since in that case the supporting device 6 with its total support area 7 is pressed against the travelling plane 8, in fact against the forces of elasticity of the entropy-elastic cover 30b, 31b of the connecting bolts 30, 31, as this can be seen from the sectioned view of FIG. 7.

As obvious from FIGS. 1 to 3, the bearing axle 2 has at least at one end a polygonal, in this case a square, actuating spigot 34, to fit a spanner or a ratchet 35, as shown in FIG. 3, to raise or lower the supporting device 6 via the lifting device 5 by swivelling the bearing axle 2 in two opposing directions of the double arrow 28. In the case illustrated, the eccentric disc 20 with its strike surface 26 shown in FIG. 2 can be swivelled counter-clockwise by means of the ratchet 35, until this strike surface 26 according to FIG. 3 reaches the stop protrusion 29 on the side plate 24.

As apparent particularly from FIGS. 8 and 9 in conjunction with FIG. 1, one of the eccentric discs 20, 21, in this case the eccentric disc 20, has an eccentric part 20a which protrudes past the external surface 24b of the associated side plate 24 of the support skid 32, the protruding part having the two strike surfaces 26, 27 for the two stable positions past the dead centre. Depending on the direction of rotation according to the double arrow 28, these two strike surfaces 26, 27 come into contact with a stop pin 29 which also protrudes past the external surface 24b of the respective side plate 24, this pin being pressed, riveted or screwed into a hole of this side plate 24.

Depending on the purpose of application the parts 20, 21; 22, 23; 24, 25, 30, 31 of the lifting device 5 and of the support skid 32 are made totally or partly from steel or plastic material or a combination of these materials. Thus, for example, in the case of light loads in the pharmaceutical area the rollers could be made from plastic material, in contrast to this, in the case of heavy loads in the industry, for example when used with packaging machines, from steel.

Naturally, within the scope of the invention the housing 3 may have a completely different design than the one illustrated, since this will not change the function of the lifting device 5 and of the supporting device 6 at all. However, the rotating ring 12, which is essential for castor wheels, can be omitted when using the roller 1 according to the invention as a fixed castor.

It is not absolutely necessary either for the connecting bolts 30, 31 between the side plates 24, 25 to have a roller shape with an entropy-elastic cover, another design is also permitted, be it a bar with a circular or parallelepiped shape.

The idea of the invention is based on making use of the bearing axle 2 as a carrier of the eccentric discs which are fastened on it in such a manner that they cannot rotate on it, in conjunction with the side plates 24, 25 also provided on the eccentric discs with their circular or oval recesses 22, 23 in a raisable and lowerable manner, which side plates form the supporting device 6 and the support skid 32 with or without the connecting bolts 30, 31. At the same time there are no limitations as far as the shape of the supports areas 24a, 25a are concerned, provided they do not obstruct the wheel 4.

By virtue of gravity, the side plates 24, 25 with their circular or oval recesses 22, 23 are suspended like the pendulum of a clock on the gliding surfaces of the eccentric discs 20, 21 and are either raised or lowered by them. Since at least one wheel 4 has to be provided on the bearing axle 2, this will be also raised and lowered. On this occasion the lowering of the supporting device 6 is inevitably connected with the raising of the wheel 4 off the travelling plane 8 and vice versa. The two stable positions past the dead centre, which are produced by the defined strike surfaces 26, 27 and, as this becomes obvious from FIGS. 2, 3 and 10, may be at an angle α between 20° and 30° to the dead centre position, assure an extremely stable position past the dead centre for the support skid 32 or the wheel 4 in the respective desired position, which cannot be changed even by a force acting accidentally on the roller 1.

What is claimed is:

1. A roller device, comprising a bearing axle and a wheel rotatably mounted thereon in a roller housing, a lifting device connected to the axle and thereby the wheel and being moveable to raise and lower said wheel out of and into a travelling plane; and a supporting device fitted to the lifting device and having a support area lowered onto the travelling plane in response to rotation of the lifting device, wherein the lifting device comprises two eccentric discs which are mounted at both ends of the bearing axle and are connected thereto in a rotationally fixed manner, one of the discs engaging in a form-locking manner a corresponding recess in a side plate of the supporting device and at least one of the eccentric discs having two spaced apart strike surfaces which can be rotated with the disc about the bearing axle in opposite directions against a stop protrusion on the side plate to thereby raise and lower said wheel.

2. A roller according to claim 1, wherein the supporting device comprises two side plates provided on the bearing axle at both sides of the housing, having an elongated support area facing the travelling plane and in the vicinity of the travelling plane are joined by two connecting bolts which protrude past ends of an external circumferential contour of the wheel to form a stable support skid having a support surface projecting at or below the travelling plate into a supporting position when the lifting device is rotated to relatively raise the wheel above the travelling plane.

3. A roller according to claim 2, wherein in the supporting position, the connecting bolts form with their external circumference a portion of the support area of the supporting device.

4. A roller according to claim 2, wherein the connecting bolts are provided with an elastic cover which is compressed in the supporting position of the support skid.

5. A roller according to claim 2, wherein the connecting bolts are provided at a distance above the travelling plane and respectively form a carrier and pivoting axle for an additional support skid pivotably suspended therefrom.

6. A roller according to claim 1, wherein the side plate of the supporting device is selected to have one of a triangular and trapezoidal shape with rounded corners and are provided with a circular or oval recess so that the side plate can be raised and lowered by said eccentric discs.

7. A roller according to claim 1, wherein at least one end of the bearing axle has an actuating spigot with a polygonal cross-section to receive a spanner or a ratchet for raising or lowering of the support skid by means of the eccentric disc.

8. A roller according to claim 1, wherein the housing has a U-shaped cross-section and free ends of legs of the housing accommodate the bearing axle, and said legs are connected to a transverse web having a rotating ring lockable with a fixing lever.

9. A roller according to claim 1, wherein an angle between a dead centre portion of the lifting device and one of the strike surfaces is between 20° and 30°.

10. A roller according to claim 1, wherein the stop protrusion is a stop pin which protrudes outward from an external surface of the side plate.

11. A roller according to claim 1, further comprising a fastening bolt having an external thread threadedly connected to the housing perpendicularly to the travelling plane of the wheel to connect to a bracket having a corresponding internal thread, onto which bracket the load to be carried by the roller can be placed in a height adjustable and lockable manner.

* * * * *